United States Patent [19]

Östrup

[11] 4,303,858
[45] Dec. 1, 1981

[54] DEVICE TO BE USED IN AUTOMATIC GAMMA COUNTERS TO MOVE THE SAMPLES INTO A MEASURING CHAMBER

[75] Inventor: Jan Östrup, Kaarina, Finland

[73] Assignee: Wallac Oy, Turku, Finland

[21] Appl. No.: 104,762

[22] Filed: Dec. 18, 1979

[51] Int. Cl.³ ..................... G01T 1/00; G01N 23/00
[52] U.S. Cl. .................................. 250/328; 250/359
[58] Field of Search ................. 250/328, 358 R, 359, 250/361 R

[56] References Cited

U.S. PATENT DOCUMENTS 3,859,528  1/1975  Luitwieler, Jr. et al. .......... 250/328
3,946,231  3/1976  Frank ................................. 250/328

Primary Examiner—Alfred E. Smith
Assistant Examiner—Janice A. Howell
Attorney, Agent, or Firm—Fisher, Christen & Sabol

[57] ABSTRACT

A device to be used in an automatic gamma counter to move sample holders (4) into a measuring chamber (6). The device comprises a slide (1) which moves the holders into the measuring chamber (6) and at the entering completely seals the chamber.

3 Claims, 8 Drawing Figures

DEVICE TO BE USED IN AUTOMATIC GAMMA COUNTERS TO MOVE THE SAMPLES INTO A MEASURING CHAMBER

The present invention refers to a device to be used in an automatic gamma counter to move gamma radiating samples arranged in samples holders into a measuring chamber shielded from radiation.

In automatic gamma counters in which the gamma radiation from a number of radio-active samples are measured, the samples are arranged in sample holders, a larger number of samples holders being located in a sample transport device provided with a moving mechanism which enables the samples to be moved in sequence into a shielded measuring chamber. One way to form the sample mechanism is to arrange a number of sample holders in elongated sample holder stands, so-called racks, which are moved around the transport device and are stepwise passing a position from which they can be moved into the measuring chamber.

Usually, the moving into the measuring chamber takes place in such a way that the sample holders are raised up from the rack into the measuring chamber.

An essential draw-back of this design is that the measuring chamber during measurement ought to be surrounded by a tight radiation absorbing shield, usually of lead, in order to avoid the effects from background radiation and radiation from adjacent samples. It is however difficult to obtain a complete sealing of the chamber by means of the device which raises the sample holders, as the raising means usually must have a smaller diameter than the sample holder. Furthermore, the measuring chamber must be located close to the rack. On the other hand, if the measuring chamber is arranged below the rack a separate shutter mechanism for the measuring chamber would be required.

An object of the present invention is therefore to provide a device to be used in an automatic gamma counter in which the sample holders in a simple way can be moved into a measuring chamber which is completely sealed after the sample holders have entered the chamber. Furthermore, the chamber can be arranged at a desired distance from the rack so that the effect of the radiation from adjacent samples is eliminated. The characteristics of the invention will appear from the claims attached to the specification.

The invention will now be described in detail, reference being made to the enclosed drawings in which FIG. 1 perspectively shows a device according to the invention.

Figure 1:
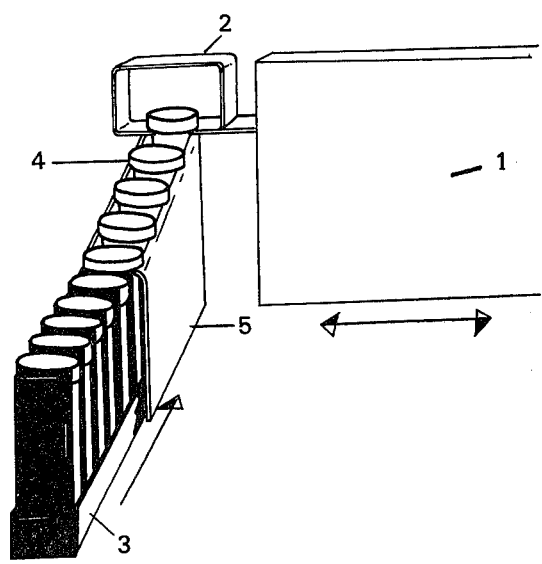
Figure 2:
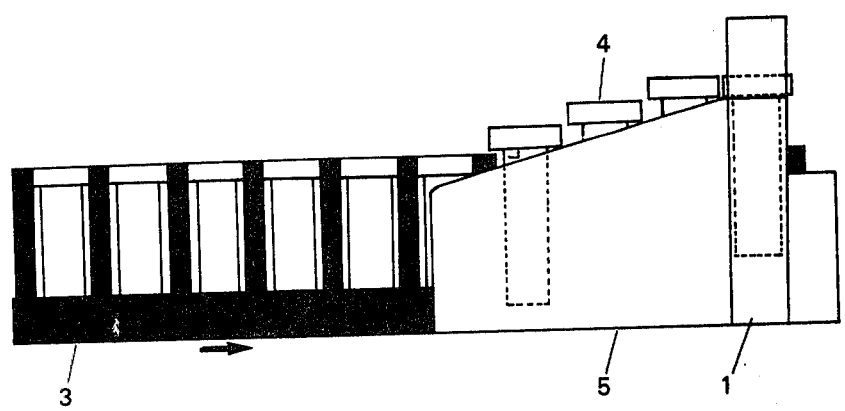
FIG. 2 is a side view of the device according to FIG. 1.
Figure 3:
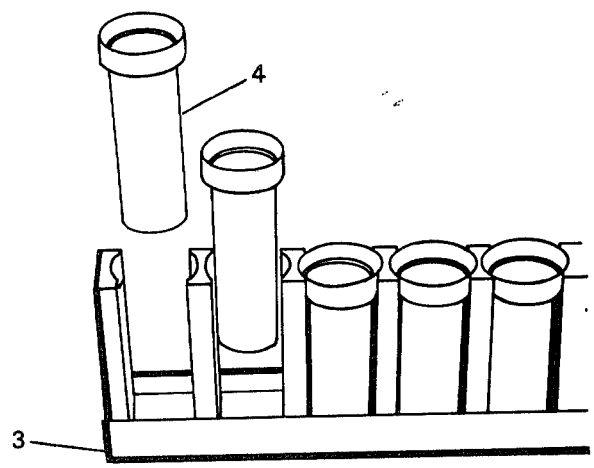
FIG. 3 shows sample holders and racks utilized at the device according to FIG. 1.

In FIGS. 1 and 2, reference 1 denotes a parallel reciprocating slide which is made of a radiation absorbing material usually lead and which is displaceable in its longitudinal direction. Furthermore, the slide is at its end provided with a means 2 which can grip around the upper edge of the sample holders 4 which are arranged in a rack 3. The rack can in a way known per se stepwise pass the slide 1 via a moving mechanism not shown in the figure, the sample holders 4 then by means of a ramp 5 being raised from the rack. FIG. 3 shows a rack in detail with sample holders which have been raised completely and partly, respectively, from the rack by means of the ramp 5.

Figure 8:
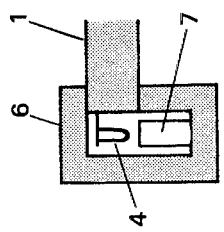
FIGS. 7 and 8 show how the device according to the invention cooperates with a measuring chamber.
Figure 6:
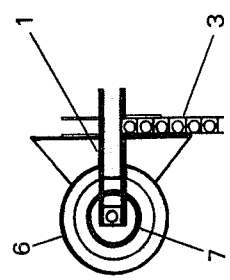
FIGS. 4-6 are sectional top views of the device according to the invention and the measuring chamber into which the samples are moved.
Figure 7:
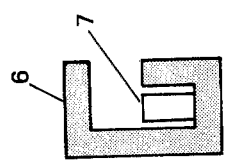
Figure 5:
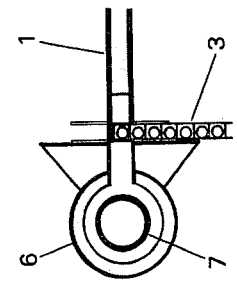
Figure 4:
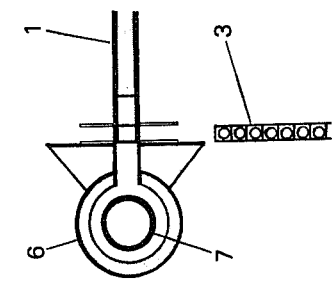

The function of the hitherto described device is shown in FIGS. 4-6, which besides the details already illustrated also show a measuring chamber 6 provided with a detector 7. In FIG. 4 the rack 3 is shown on its way towards the position where the sample holders can be raised from the rack. In FIG. 5 the first sample holder has reached a position right in front of the slide 1, the rack then being stopped and moved by the slide into the measuring chamber as shown in FIG. 6. The measuring chamber is provided with a an aperture which is completely filled up by the slide 1. The principal shaping of the measuring chamber is shown in FIG. 7 while FIG. 8 shows the measuring chamber after the sample holder 4 has been moved into the chamber by the slide 1.

The device according to the invention thus in a simple way enables the sample holders to be moved into a completely sealed measuring chamber which can be arranged at a desired distance from the rack. This is of special value when measuring high energy isotopes with radiation energies up to 4 MeV.

We claim:

1. In an automatic gamma counter for measuring radioactive samples contained in sample holders removably supported in elongated racks which are moved step-by-step in a longitudinally directional path past a measuring station comprising:
   a radiation shielded chamber disposed at said station on one side of said path, said chamber having an opening facing a sample holder positioned at said station through which sample holders are to be sequentially introduced into the chamber for measuring;
   a slide fabricated of radiation shielding material mounted at said station on the opposite side of said path and facing said opening for horizontal reciprocating movement perpendicular to said path between a retracted position on the side of the path opposite from said opening and a projected position in engagement with said opening;
   said slide having a configuration to engage with said opening in said projected position to provide a radiation shielded closure for said chamber; and
   transferring and gripping means for removing a sample holder from a rack at said station when the slide is in said retracted position and for suspending the removed holder in said shielded chamber when in said projected position.

2. The apparatus of claim 1, wherein said sample holders are removable from a rack when at least partially raised from a normal position, and said gripping means is mounted on said slide at a level above the upper levels of sample holders in their normal positions in the racks, said transferring means comprising ramp means at said station for progressively raising successive sample holders during step-by-step movement toward said gripping means.

3. The apparatus of claim 2, wherein the upper margins of the sample holders are radially outwardly enlarged, said gripping means including a pair of horizontally spaced elements for engaging under the opposite sides of the enlarged margin of a sample holder, said racks comprising a series of longitudinally spaced vertical supports having recesses at their upper ends into which said enlarged margins are received when the sample holders are in normal position to prevent horizontal displacement of the sample holders, the spaces between said vertical supports being sufficient to permit sidewise removal of a sample holder when partially raised from a normal position.

* * * * *